(No Model.)
E. E. DAVIS.
ANT TRAP.
No. 407,889. Patented July 30, 1889.
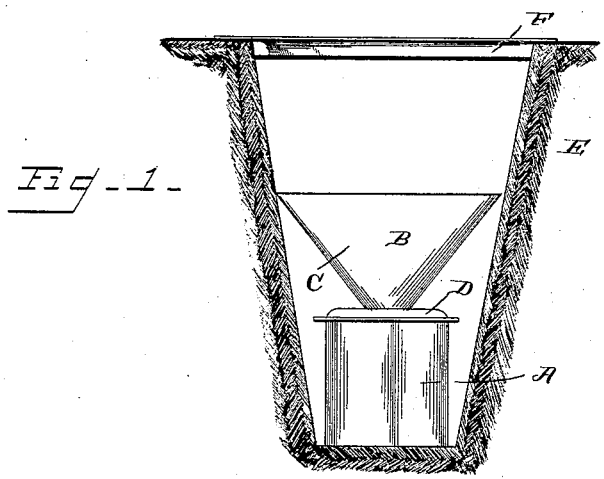
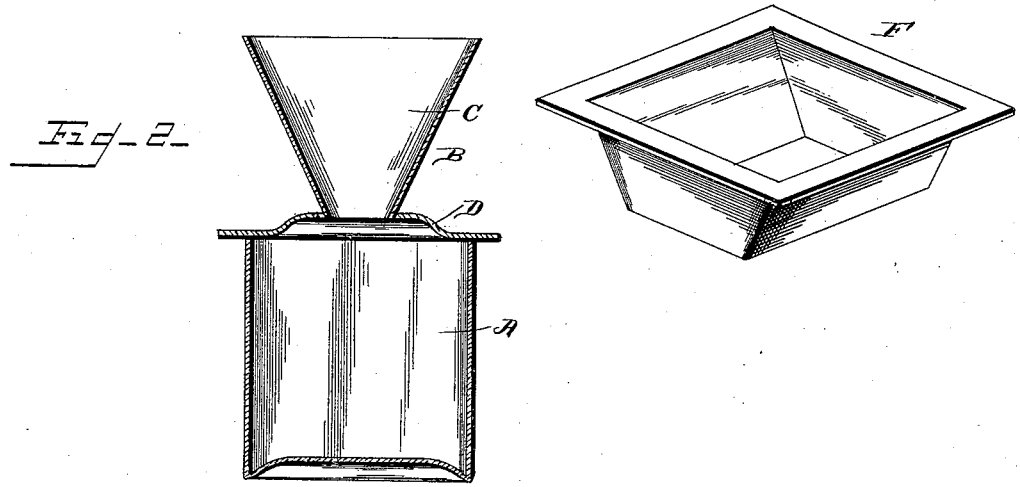
Witnesses
Geo. E. Fuch.
R. W. Bishop.
Inventor
Edwin E. Davis.
By his Attorneys

UNITED STATES PATENT OFFICE.

EDWIN E. DAVIS, OF BLUFF DALE, TEXAS.

ANT-TRAP.

SPECIFICATION forming part of Letters Patent No. 407,889, dated July 30, 1889.

Application filed April 11, 1889. Serial No. 306,832. (No model.)

*To all whom it may concern:*

Be it known that I, EDWIN E. DAVIS, a citizen of the United States, residing at Bluff Dale, in the county of Erath and State of Texas, have invented a new and useful Ant-Trap, of which the following is a specification.

My invention relates to improvements in ant-traps; and it consists in certain novel features, hereinafter described and claimed.

In the accompanying drawings, Figure 1 is an elevation of my improved trap, showing it in its operative position, and Fig. 2 is a vertical section. Fig. 3 is a detail view of the curb at the top of the ant-hole.

In carrying out my invention I employ a body A, which is preferably cylindrical, but may be of any other desired form, and is constructed of some smooth material—such as tin or glass, and preferably of the latter. This body A has an open top, and upon this open top I support the funnel or hopper B, consisting of the inverted conical portion C and the base D, extending from the lower end of said conical portion and covering the top of the body. This funnel or hopper is preferably constructed of the same material as the body, but may be made from any suitable material.

In practice I dig a hole in the ground through the nest of ants, as shown at E, and the said hole is tapered toward its bottom, as clearly shown. The body and the hopper or funnel are placed in the bottom of this hole, and above the hopper, in the upper end of the hole E, I place a curb F, having a smooth surface, which is arranged so as to fit closely in the open upper end of the hole. This curb may be constructed of a single piece of material or of a series of strips secured together. The trap being thus placed in the nest of the ants, the ants will pass through the several passages in the walls of the opening and drop to the bottom and fall through the hopper or funnel into the body. The earth is made to fit closely around the hopper, so that it will be impossible for the ants to pass between the hopper and the wall of the hole and will be forced through the hopper. From the hopper they pass at once to the body, where they will be collected, it being impossible for them to climb up the smooth surface of the body and thus escape. The curb in the upper end of the hole also prevents the escape of the ants by entirely surrounding the entrance or upper end of the hole, so that the ants can fall in but cannot crawl out.

From the foregoing description it will be seen that I have provided a very simple ant-trap, which will be efficient in operation and can be manufactured and sold at a slight cost.

Having thus described my invention, what I claim, and desire to secure by Letters Patent, is—

1. An ant-trap consisting of an open endless curb having inclined sides and arranged in the upper end of an opening in the ground, the body arranged in the said opening in the ground beneath the open curb, and the hopper supported by the body and adapted to conduct the ants from the curb into the body, as set forth.

2. The curb for ant-traps having inclined sides and an annular horizontal flange, as set forth.

In testimony that I claim the foregoing as my own I have hereto affixed my signature in presence of two witnesses.

EDWIN E. DAVIS.

Witnesses:
W. A. BASSEL,
ELI OXFORD.